US011466153B2

(12) United States Patent
Wiedemann et al.

(10) Patent No.: US 11,466,153 B2
(45) Date of Patent: *Oct. 11, 2022

(54) POLYAMIDE MOLDING COMPOUND

(71) Applicant: EMS-PATENT AG, Domat/Ems (CH)

(72) Inventors: Thomas Wiedemann, Domat/Ems (CH); Georg Stöppelmann, Bonaduz (CH)

(73) Assignee: EMS-PATENT AG, Domat/Ems (CH)

( * ) Notice: Subject to any disclaimer, the term of this patent is extended or adjusted under 35 U.S.C. 154(b) by 10 days.

This patent is subject to a terminal disclaimer.

(21) Appl. No.: 16/956,576

(22) PCT Filed: Dec. 6, 2018

(86) PCT No.: PCT/EP2018/083804
§ 371 (c)(1),
(2) Date: Jun. 20, 2020

(87) PCT Pub. No.: WO2019/121038
PCT Pub. Date: Jun. 27, 2019

(65) Prior Publication Data
US 2021/0032465 A1  Feb. 4, 2021

(30) Foreign Application Priority Data
Dec. 22, 2017  (EP) .................................. 17210163

(51) Int. Cl.
*C08L 77/06* (2006.01)
(52) U.S. Cl.
CPC ........... *C08L 77/06* (2013.01); *C08L 2201/10* (2013.01); *C08L 2205/025* (2013.01)
(58) Field of Classification Search
CPC ........... C08L 2205/02; C08L 2205/025; C08L 2205/03; C08L 2205/035
See application file for complete search history.

(56) References Cited

U.S. PATENT DOCUMENTS

| 5,750,262 | A  | 5/1998  | Gasse et al. |
| 6,528,560 | B2 | 3/2003  | Bühler |
| 7,723,411 | B2 | 5/2010  | Schneider |
| 7,973,191 | B2 | 7/2011  | Doring et al. |
| 8,022,170 | B2 | 9/2011  | Hoffman et al. |
| 8,138,243 | B2 | 3/2012  | Bühler et al. |
| 8,268,956 | B2 | 9/2012  | Bühler et al. |
| 8,383,244 | B2 | 2/2013  | Bayer et al. |
| 8,404,323 | B2 | 3/2013  | Pfleghar et al. |
| 8,586,662 | B2 | 11/2013 | Harder et al. |
| 8,604,120 | B2 | 12/2013 | Stöppelmann et al. |
| 8,993,662 | B2 | 3/2015  | Kaplan |
| 9,109,115 | B2 | 8/2015  | Bühler |
| 9,133,322 | B2 | 9/2015  | Roth et al. |
| 9,359,532 | B2 | 6/2016  | Kaplan |
| 9,453,106 | B2 | 9/2016  | Bühler et al. |
| 9,546,273 | B2 | 1/2017  | Huelsmann et al. |
| 9,644,081 | B2 | 5/2017  | Aepli et al. |
| 9,663,655 | B2 | 5/2017  | Aepli |
| 9,815,967 | B2 | 11/2017 | Harder et al. |
| 9,963,547 | B2 | 5/2018  | Hoppe et al. |
| 9,963,591 | B2 | 5/2018  | Bayer et al. |
| 9,969,882 | B2 | 5/2018  | Thomas et al. |
| 10,005,268 | B2 | 6/2018  | Jeltsch et al. |
| 10,047,054 | B2 | 8/2018  | Kaplan |
| 10,144,805 | B2 | 12/2018 | Bayer et al. |
| 10,233,326 | B2 | 3/2019  | Koch et al. |
| 10,544,286 | B2 | 1/2020  | Nakano et al. |
| 10,577,478 | B2 | 3/2020  | Fujii et al. |
| 10,683,418 | B2 | 6/2020  | Thomas et al. |
| 10,717,816 | B2 | 7/2020  | Aepli et al. |
| 10,751,961 | B2 | 8/2020  | Cheung |
| 10,767,047 | B2 | 9/2020  | Aepli et al. |
| 10,767,048 | B2 | 9/2020  | Aepli et al. |
| 10,836,905 | B2 | 11/2020 | Wiedemann et al. |
| 10,843,389 | B2 | 11/2020 | Weis et al. |
| 2001/0031805 | A1 | 10/2001 | Bühler |
| 2006/0235190 | A1 | 10/2006 | Hoffman et al. |
| 2006/0264542 | A1 | 11/2006 | Schneider |
| 2008/0135720 | A1 | 6/2008  | Bühler et al. |
| 2008/0300347 | A1 | 12/2008 | Kurz et al. |
| 2009/0085019 | A1 | 4/2009  | Bühler et al. |
| 2010/0069657 | A1 | 3/2010  | Doring et al. |
| 2010/0168423 | A1 | 7/2010  | Doring et al. |
| 2010/0279111 | A1 | 11/2010 | Harder et al. |
| 2011/0220667 | A1 | 9/2011  | Pfleghar et al. |
| 2012/0029133 | A1 | 2/2012  | Stöppelmann et al. |
| 2012/0115993 | A1 | 5/2012  | Kaplan |
| 2012/0237708 | A1 | 9/2012  | Caviezel et al. |
| 2012/0321829 | A1 | 12/2012 | Bayer et al. |
| 2013/0136911 | A1 | 5/2013  | Bender et al. |

(Continued)

FOREIGN PATENT DOCUMENTS

| EP | 0 755 777 A1 | 1/1997 |
| EP | 1 130 059 A1 | 9/2001 |
| EP | 1 992 659 A1 | 11/2008 |
| EP | 2 857 437 A1 | 4/2015 |
| EP | 2 933 295 A1 | 10/2015 |
| EP | 2 952 319 A1 | 12/2015 |
| JP | 2016-079229 A | 5/2016 |

OTHER PUBLICATIONS

European Patent Office, International Search Report in International Application No. PCT/EP2018/083804 (dated Mar. 20, 2019).

(Continued)

*Primary Examiner* — Ana L. Woodward
(74) *Attorney, Agent, or Firm* — Leydig, Voit & Mayer, Ltd.

(57) ABSTRACT

The present invention relates to polyamide molding compounds which contain the following components (A) to (C) or consist of these components: (A) 50 to 98% by weight of at least one amorphous or microcrystalline specific polyamide; (B) 2 to 40% by weight of at least one semicrystalline polyamide which is selected from the group consisting of PA 616, PA 516, PA 1016 and mixtures thereof; and (C) 0 to 16% by weight of at least one additive; the constituent amounts of the components (A) to (C) adding up to 100% by weight. The present invention also relates to molded articles made of these polyamide molding compounds and the use thereof.

15 Claims, No Drawings

(56) References Cited

U.S. PATENT DOCUMENTS

| | | |
|---|---|---|
| 2013/0317168 A1 | 11/2013 | Bühler et al. |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Bühler |
| 2015/0051343 A1 | 2/2015 | Kaplan |
| 2015/0099847 A1 | 4/2015 | Huelsmann et al. |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffman et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0369098 A1 | 12/2016 | Yasuda et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251600 A1 | 9/2018 | Hoffmann et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |
| 2020/0024415 A1 | 1/2020 | Holzschuh et al. |
| 2020/0024416 A1 | 1/2020 | Holzschuh et al. |
| 2020/0109284 A1 | 4/2020 | Wiedemann |
| 2020/0198203 A1 | 6/2020 | Caviezel |

OTHER PUBLICATIONS

European Patent Office, Written Opinion in International Application No. PCT/EP2018/083804 (dated Mar. 20, 2019).

International Bureau of WIPO, International Preliminary Report on Patentability in International Application No. PCT/EP2018/083804 (dated Jun. 23, 2020).

European Patent Office, Extended European Search Report in European Application No. 17210163.6 (dated Jun. 12, 2018).

POLYAMIDE MOLDING COMPOUND

CROSS-REFERENCE TO RELATED APPLICATIONS

This patent application is the U.S. national phase of International Application No. PCT/EP2018/083804, filed on Dec. 6, 2018, which claims the benefit of European Patent Application No. 17210163.6, filed Dec. 22, 2017, the disclosures of which are incorporated herein by reference in their entireties for all purposes.

The present invention relates to polyamide moulding compounds which are based on a mixture of specific amorphous or microcrystalline polyamides and specific partially crystalline polyamides and are distinguished by a very good stress crack resistance and, at the same time, by very good optical properties, in particular a high light transmission and a low haze.

Furthermore, the present invention relates to moulded articles made from the polyamide moulding compound according to the invention and uses of the polyamide moulding compound for the production of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g. USB sticks), protective covers for mobile phones, trim parts in the computer and telecommunication field, pipes, hoses, films and components of e-cigarettes.

Mixtures of amorphous or microcrystalline polyamides and partially crystalline polyamides are already described in the state of the art.

EP 1 992 659 A 1 describes a polyamide moulding compound melt for the production of transparent moulded parts which have, for light up to a wavelength of 400 nm, a reduced transmission. The polyamide moulding compound is based on a mixture of transparent polyamides or a blend of transparent polyamides with at least one partially crystalline polyamide.

EP 2 952 319 A1 relates to a method for low-stress injection moulding of amorphous or microcrystalline polyamides in which a melt of the amorphous or microcrystalline polyamides is processed and injection moulded in specific conditions. Hence low-stress moulded articles made of the amorphous or microcrystalline polyamides can be produced by injection moulding. A part of the amorphous or microcrystalline polyamides can thereby be replaced by a partially crystalline polyamide.

EP 2 857 437 A 1 describes a polyamide mixture which consists, up to at least 50% by weight, of a polyamide component which consists of a) 50 to 95 parts by weight of PA PACMX (with X=8 to 18) and also b) 50 to 5 parts by weight of a linear, aliphatic polyamide with on average 8 to 12 C atoms in the monomer units. The sum of the parts by weight being 100.

EP 0 755 777 A 1 relates to a slidable, sealable, very readily deep-drawable composite film based on polyamide and polyolefins, the film made of at least one layer of aliphatic polyamide (A) and at least one layer of a polymer blend (B), which consists of 10 to 60% by weight of amorphous polyamide and 40 to 90% by weight of aliphatic polyamide and at least one thermoplastic sealing layer (C) and at least one connecting layer (D), being disposed such that a sealing layer and a layer of aliphatic polyamide are situated on the outsides of the film and such that the film is unstretched.

EP 2 933 295 A 1 describes a polyamide moulding compound which comprises an amorphous polyamide, a partially crystalline aliphatic polyamide and also glass fibres for reinforcement. Furthermore, the polyamide moulding compound comprises a polyamide made of a cycloaliphatic diamine and a dimerised fatty acid.

US 2016/0369098 A1 relates to the use of at least one partially crystalline polyamide in a glass-reinforced amorphous polyamide resin in order to produce a composition which is more transparent than the resin.

Starting therefrom, the object was to provide a polyamide moulding compound which displays improved stress crack resistance with as low losses as possible relating to the optical properties, expressed by a low haze and a high light transmission.

This object is achieved by the polyamide moulding compound described herein which has the following features.

Polyamide moulding compound comprising the following components (A) to (C) or consisting of these components:

(A) 50 to 98% by weight of at least one amorphous or microcrystalline polyamide, selected from the group consisting of PA MACM10, PA MACM12, PA MACM14, PA MACM16, PA MACM18, PA NDT/INDT, PA TMDC10, PA TMDC12, PA TMDC14, PA TMDC16, PA TMDC18, PA PACM10/11, PA PACM10/12, PA PACM12/612, PA PACM12/PACM14/612/614, PA MACMI/12, PA MACMT/12, PA MACMI/MACM12, PA MACMI/MACMN, PA MACMT/MACM12, PA MACMT/MACMN, PA MACM36, PA TMDC36, PA MACMI/MACM36, PA 6I/MACMI/12, PA MACMT/MACM36, PA MACMI/MACMT/12, PA 6I/6T/MACMI/MACMT, PA 6I/6T/MACMI/MACMT/12, PA 6I/6T/MACMI/MACMT/MACM12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM16/1016, PA MACM18/1018, PA 6I/6T/MACMI/MACMT/MACM12/612, PA 6I/6T/MACMI/MACMT/MACM12, PA MACMI/MACMT/MACM12/12, PA MACMI/MACMT/MACM12, PA 6I/6T/MACMI/MACMT/12, PA 6I/6T/6N/MACMI/MACMT/MACMN, PA TMDC12/TMDCT/TMDC36, PA TMDC12/TMDCI, PA TMDC12/TMDCI/TMDC36 and PA TMDC12/TMDCT and mixtures or copolymers hereof, the MACM being able to be replaced up to max. 35% by mol by PACM and/or TMDC, relative to the sum of the molar proportions of all the monomers of 100% by mol and/or the laurinlactam being able to be replaced totally or partially by caprolactam, (B) 2 bis 40% by weight of at least one partially crystalline polyamide selected from the group consisting of PA 516, PA 616, PA 1016 and mixtures hereof;
(C) 0 bis 16% by weight of at least one additive;
the quantities of components (A) to (C) adding up in total to 100% by weight.

Advantageous embodiments of the polyamide moulding compound according to the invention are described herein.

Furthermore, the present invention relates to moulded articles which are producible from the polyamide moulding compound according to the invention. Advantageous embodiments of these moulded articles are also described herein and relate to uses of the polyamide moulding compound according to the invention.

Definitions of Terms

Spellings and Abbreviations for Polyamides and the Monomers Thereof

In the sense of the present invention there is understood by the term "polyamide" (abbreviation PA) a generic term including homopolyamides and copolyamides. The chosen spellings and abbreviations for polyamides and the monomers thereof correspond to those set in the ISO standard 16396-1 (2015, (D)). The abbreviations used therein are synonymous in the following with the IUPAC names of the monomers. In particular the following abbreviations for monomers appear in the present application, MACM for bis(4-amino-3-methylcyclohexyl)methane (also termed 3,3'-dimethyl-4,4'-diaminodicyclohexylmethane, CAS-no. 6864-37-5), TMDC for bis(4-amino-3,5-dimethylcyclohexyl)methane (also termed 3,3',5,5'-tetramethyl-4,4'-diaminodicyclohexylmethane, CAS-no. 65962-45-0), PACM for bis(4-aminocyclohexyl)methane (also termed 4,4'-diaminodicyclohexylmethane, CAS-no. 1761-71-3), N for 2,6-naphthalenedicarboxylic acid (CAS-no. 1141-38-4), T for terephthalic acid (CAS-no. 100-21-0), I for isophthalic acid (CAS-no. 121-95-5), 16 for hexadecanedioic acid (CAS-no. 505-54-4), 12 for dodecanedioic acid (also termed 1,10-decanedicarboxylic acid, CAS-no. 693-23-2), 6 for 1,6-hexanediamine (CAS-no. 124-09-4), 12 for laurinlactam (CAS-no. 947-04-6) and 12 for ω-aminododecanoic acid (CAS-no. 693-57-2).

Amorphous or Microcrystalline Polyamides

Amorphous or microcrystalline polyamides display, in differential scanning to calorimetry (DSC) according to ISO 11357-3 (2013) with a heating rate of 20 K/min, preferably a melting heat of max. 50 J/g, particularly preferably of max. 25 J/g, very particularly preferably 0 to 22 J/g.

Microcrystalline polyamides are partially crystalline polyamides and have therefore a melting point. However they have a morphology in which the crystallites have such a small dimension that a plate produced therefrom with a thickness of 2 mm is still transparent, i.e. its light transmission is at least 75%, measured according to ASTM D 1003-13 (2013).

Amorphous polyamides have, compared with microcrystalline polyamides, a lower melting heat. The amorphous polyamides display, in dynamic differential scanning calorimetry (DSC) according to ISO 11357-3 (2013) with a heating rate of 20 K/min, preferably a melting heat of max. 5 J/g, particularly preferably of max. 3 J/g, very particularly preferably of 0 to 1 J/g, and have no melting point.

Quantities of the Monomers

If the polyamides of the present invention comprise only diacids and diamines, then the molar quantities thereof add up to 50% by mol for all diamines and 50% by mol for all diacids and the sum of the diamine- and diacid components produces 100% by mol for the polyamide.

The polyamides of the present invention can comprise, in addition to dicarboxylic acids and diamines, also lactams or ω-amino acids at X % by mol, then the sum of all the diamines would be only (50-0.5 X) % by mol and the sum of all the dicarboxylic acids (50-0.5 X) % by mol, relative to 100% by mol for the polyamide.

The quantities with respect to the monomers should thereby be understood such that a corresponding molar ratio of these monomers used in the polycondensation is also found again in the polyamides produced in such a way by polycondensation.

In General with Respect to Quantities

The polyamide moulding compounds according to the present invention comprise components (A), (B) and possibly (C) or preferably consist exclusively of these, the proviso thereby applies that components (A), (B) and (C) add up in total to 100% by weight. The fixed ranges of these quantities for the individual components (A), (B) and (C) should be understood such that, within the prescribed ranges, an arbitrary quantity for each of the individual components can be selected provided the strict proviso is fulfilled that the sum of all the components (A) to (C) produces 100% by weight.

All the monomers contained in polyamide (A) add up in total to 100% by mol. The fixed ranges of the quantities for the individual monomers should be understood such that, within the prescribed ranges, an arbitrary quantity for each of the individual components can be selected provided the strict proviso is fulfilled that the sum of all the monomers contained in polyamide (A) produces 100% by mol.

Polyamide Moulding Compound

The polyamide moulding compound according to the invention comprises components (A) to (C) or consists of these.

According to a preferred embodiment of the present invention, the proportion of component (A) in the polyamide moulding compound is in the range of 55 to 95.9% by weight, preferably of 63 to 94.7% by weight or 63 to 93.7% by weight and particularly preferably of 76 to 89.5% by weight, relative to the total weight of the polyamide moulding compound.

According to a further preferred embodiment of the present invention, the proportion of component (B) in the polyamide moulding compound is in the range of 4 to 35% by weight, preferably of 5 to 31% by weight and particularly preferably of 10 to 20% by weight, relative to the total weight of the polyamide moulding compound.

A further preferred embodiment provides that the proportion of component (C) in the polyamide moulding compound is in the range of 0.1 to 20% by weight, preferably of 0.3 to 6% by weight and particularly preferably of 0.5 to 4% by weight, relative to the total weight of the polyamide moulding compound.

According to a preferred embodiment of the present invention, the proportion of component (A) in the polyamide moulding compound is in the range of 55 to 95.9% by weight, preferably of 63 to 94.7% by weight or 63 to 93.7% by weight and particularly preferably of 76 to 89.5% by weight, and the proportion of component (B) in the polyamide moulding compound is in the range of 4 to 35% by weight, preferably of 5 to 31% by weight and particularly preferably of 10 to 20% by weight, and the proportion of component (C) in the polyamide moulding compound is in the range of 0.1 to 20% by weight, preferably of 0.3 to 6% by weight and particularly preferably of 0.5 to 4% by weight, respectively relative to the total weight of the polyamide moulding compound.

According to another preferred embodiment of the present invention, the haze of the polyamide moulding compound, measured on a moulded article produced from the polyamide moulding compound (2 mm thick plates with width and length: 60×60 mm) according to ASTM D1003 (2013), is <15%, preferably <10%, particularly preferably <6% and very particularly preferably <1.0%.

A further preferred embodiment of the present invention provides that the transparency, measured on a moulded article produced from the polyamide moulding compound (2 mm thick plates with width and length: 60×60 mm) according to ASTM D1003, is at least 80%, preferably at least 85% and particularly preferably at least 90%.

According to a preferred embodiment of the present invention, a test piece made of the polyamide moulding compound according to the invention
- has a modulus of elasticity in tension, determined according to ISO 527 (2012), of at least 1,000 MPa, preferably at least 1,200 MPa and particularly preferably at least 1,300 MPa; and/or
- has a stress crack resistance in toluene, determined according to DIN 53449-3 (1984) bending strip method, of at least 20 MPa, preferably at least 25 MPa and particularly preferably at least 30 MPa; and/or
- has a stress crack resistance in n-hexane, determined according to DIN 53449-3 (1984) bending strip method, of at least 20 MPa, preferably at least 25 MPa and particularly preferably at least 30 MPa; and
- the haze of the polyamide moulding compound, measured on a moulded article produced from the polyamide moulding compound (2 mm thick plates with width and length: 60×60 mm) according to ASTM D1003 (2013), is <15%, preferably <10%, particularly preferably <6% and very particularly preferably <1.0%; and
- the light transmission, measured on a moulded article produced from the polyamide moulding compound (2 mm thick plates with width and length: 60×60 mm) according to ASTM D1003 (2013), is at least 80%, preferably at least 85%, and particularly preferably at least 90%.

According to a preferred embodiment of the present invention, the polyamide moulding compound according to the invention is free of glass fibres.

In the following, preferred embodiments for components (A) to (C) are indicated.

Component (A)

According to a preferred embodiment of the present invention, the content of naphthalenedicarboxylic acid in component (A) is 0 to 10% by mol, relative to the sum of the molar proportions of all the monomers of components (A) of 100% by mol.

Another preferred embodiment of the present invention provides that the lactam- and/or ω-amino acid content in component (A) is 0 to 50% by mol, preferably 0 to 40% by mol, and particularly preferably 0 to 35% by mol, relative to the sum of the molar proportions of all the monomers of component (A) of 100% by mol.

According to a further preferred embodiment of the present invention, the content of naphthalenedicarboxylic acid in component (A) is max. 10% by mol, relative to the sum of the molar proportions of all the monomers of component (A) of 100% by mol, and the lactam- and/or ω-amino acid content in component (A) is 0 to 50% by mol, preferably 0 to 40% by mol, and particularly preferably 0 to 35% by mol, relative to the sum of the molar proportions of all the monomers of component (A) of 100% by mol.

According to a another preferred embodiment of the present invention, component (A) is selected from the group consisting of PA MACM10, PA MACM12, PA MACM14, PA MACM16, PA MACM18, PA MACM36, PA TMDC10, PA TMDC12, PA TMDC14, PA TMDC16, PA TMDC18, PA NDT/INDT, PA PACM10/11, PA PACM10/12, PA PACM12/612, PA PACM12/PACM14/612/614, PA MACMI/12, PA MACMT/12, PA MACMI/MACM12, PA MACMT/MACM12, PA MACMI/MACMT/12, PA MACMI/MACMT/MACM12, PA MACMI/MACMT/MACM12/12, PA MACMI/MACMT/MACM12, PA 6I/6T/MACMI/MACMT, PA 6I/6T/MACMI/MACMT/12, PA 6I/6T/MACMI/MACMT/MACM12/12, PA 6I/6T/MACMI/MACMT/MACM12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM16/1016, PA MACM18/1018, PA MACM10/PACM10, PA MACM12/PACM12, PA MACM14/PACM14, PA MACM16/PACM16, PA MACM18/PACM18, PA 6I/6T/MACMI/MACMT/PACMI/PACMT/12, PA 6I/6T/MACMI/MACMT/MACM12/PACMI/PACMT/PACM12 and mixtures or copolymers thereof.

For particular preference, component (A) is selected from the group consisting of PA MACM12, PA MACM14, PA MACM16, PA MACM18, PA TMDC16, PA TMDC18, PA NDT/INDT, PA PACM12/612, PA PACM12/PACM14/612/614, PA MACMI/12, PA MACMT/12, PA MACMI/MACM12, PA MACMI/MACMT/12, PA MACMI/MACMT/MACM12, PA 6I/6T/MACMI/MACMT/12, PA MACM10/1010, PA MACM12/1012, PA MACM12/1212, PA MACM14/1014, PA MACM16/1016, PA MACM18/1018, PA MACM10/PACM10, PA MACM12/PACM12, PA MACM14/PACM14, PA MACM16/PACM16, PA MACM18/PACM18, PA 6I/6T/MACMI/MACMT/PACMI/PACMT/12 and mixtures hereof.

For particular preference, component (A) is selected from the group consisting of PA MACM14, PA MACM16, PA MACM18, PA MACMI/12, PA MACMI/MACM12, PA MACMI/MACMT/12, PA MACMI/MACMT/MACM12, PA 6I/6T/MACMI/MACMT/12, PA MACM10/1010, PA MACM12/1012, PA MACM12/1212, PA MACM14/1014, PA MACM16/1016, PA MACM18/1018, PA MACM12/PACM12, PA MACM14/PACM14, PA MACM16/PACM16, PA MACM18/PACM18, PA 6I/6T/MACMI/MACMT/PACMI/PACMT/12 and mixtures hereof.

Most preferably, component (A) is selected from the group consisting of PA MACM14, PA MACM16, PA MACM18, PA MACMI/12, PA MACMI/MACMT/12, PA MACM10/1010, PA MACM14/1014, PA MACM16/1016, PA MACM18/1018, PA MACM12/PACM12, PA MACM14/PACM14, PA MACM16/PACM16, PA MACM18/PACM18 and mixtures hereof.

Another preferred embodiment provides that component (A) comprises PA PACM12/612 and particularly preferable consists thereof and the proportion of 1,6-hexanediamine is 2 to 24% by mol, and preferably 6 to 15% by mol, the sum of the molar proportions of all the monomers producing 100% by mol. The polyamides PA PACM12/612 with max. 24% by mol of 1,6-hexanediamine are microcrystalline.

According to a further preferred embodiment, component (A) comprises PA PACM12/PACM14/612/614 and particularly preferably consists thereof, and the proportion of 1,6-hexanediamine is 2 to 24% by mol and preferably 6 to 15% by mol and/or the proportion of 1,14-tetradecanedioic acid is 2 to 24% by mol and preferably 6 to 15% by mol, the sum of the molar proportions of all the monomers producing 100% by mol. The polyamides PA PACM12/PACM14/612/614 with max. 24% by mol of 1,6-hexanediamine are microcrystalline.

According to another preferred embodiment, component (A) comprises amorphous PA MACMI/12 and particularly preferably consists thereof, and the proportion of laurinlactam is 15 to 50% by mol, preferably 20 to 40% by mol and particularly preferably 19% by mol or 35% by mol, the sum of the molar proportions of all the monomers producing 100% by mol.

Another preferred embodiment of the present invention provides that component (A) comprises amorphous PA/MACMI/MACMT/12 and particularly preferably consists thereof, and the proportion of isophthalic acid is equal to the proportion of terephthalic acid, and/or the proportion of laurinlactam is 15 to 40% by mol and preferably 20 to 30% by mol, particularly preferably the molar ratio of the components MACMI/MACMT/12=38/38/24, the sum of the molar proportions of all the monomers producing 100% by mol.

According to a further preferred embodiment, component (A) comprises amorphous PA MACMI/MACMT/MAMC12 and preferably consists thereof, and the proportion of isophthalic acid is equal to the proportion of terephthalic acid, and/or the proportion of dodecanedioic acid is 30 to 60% by mol and preferably 40 to 50% by mol, particularly preferably the molar ratio of the components MACMI/MACMT/MAMC12=27/27/46, the sum of the molar proportions of all the monomers producing 100% by mol.

According to another preferred embodiment, component (A) comprises amorphous PA 6I/6T/MACMI/MACMT/12 and preferably consists thereof, and the proportion of isophthalic acid is equal to the proportion of terephthalic acid, and/or the proportion of laurinlactam is 1 to 25% by mol, preferably 2 to 15% by mol, particularly preferably the molar ratio of the components 6I/6T/MACMI/MACMT/12=34/34/14/14/4 or 39/39/9.6/9.6/2.8, the sum of the molar proportions of all the monomers producing 100% by mol.

Another preferred embodiment of the present invention provides that component (A) comprises a polyamide selected from the group consisting of PA MACM10/1010, PA MACM12/1012, PA MACM12/1212, PA MACM14/1014, PA MACM14/1214 and mixtures thereof and particularly preferably consists thereof, and the proportion of linear aliphatic polyamide is 5 to 45% by mol, preferably 8 to 27% by mol and particularly preferably 10 to 22% by mol; the sum of the molar proportions of all the monomers producing 100% by mol. The polyamides PA MACM10/1010, PA MACM12/1012, PA MACM12/1212, PA MACM14/1014, PA MACM14/1214 with max. 27% by mol of linear aliphatic diamine are amorphous.

According to a further preferred embodiment, component (A) comprises a polyamide selected from the group consisting of PA MACM10/PACM10, PA MACM12/PACM12, PA MACM14/PACM14, PA MACM18/PACM18 and mixtures thereof and particularly preferably consists thereof, and the proportion of PACM is 1 to 35% by mol and preferably 2 to 25% by mol, the sum of the molar proportions of all the monomers producing 100% mol. The polyamides PA MACM10/PACM10, PA MACM12/PACM12 or PA MACM14/PACM14, PA MACM16/PACM16, PA MACM18/PACM18 with max. 25% by mol of PACM are amorphous.

A further preferred embodiment provides that component (A) comprises amorphous PA 6I/6T/MACMI/MACMT/PACMI/PACMT/12 and particularly preferably consists thereof, and the proportion of isophthalic acid is equal to the proportion of terephthalic acid, and/or the proportion of laurinlactam is 2 to 15% by mol, preferably 2 to 7% by mol and/or the proportion of PACM is 2 to 7% by mol, the sum of the molar proportions of all the monomers producing 100% by mol.

Furthermore, it is preferred if component (A) has a relative viscosity determined on solutions of 0.5 g polymer in 100 ml m-cresol according to ISO 307 (2013) at 20° C., of 1.35 to 2.15, particularly preferably of 1.40 to 2.00 and very particularly preferably of 1.45 and 1.90, and/or if component (A) has a glass transition temperature of 100 to 210° C., preferably of 110 to 200° C. and particularly preferably of 120 to 190° C., the glass transition temperature being determined by means of DSC according to ISO 11357-2 (2013) with a heating rate of 20 K/min.

Component (B)

Component (B) is selected from partially crystalline polyamides selected from the group consisting of PA 516, PA 616, PA 1016 and mixtures thereof.

According to a preferred embodiment, component (B) is selected from the group consisting of PA 616, PA 1016 and mixtures hereof and particularly preferably component (B) is PA 616.

Furthermore, it is preferred if component (B) has a relative viscosity, determined on solutions of 0.5 g polymer in 100 ml m-cresol according to ISO 307 (2013) at 20° C., of 1.45 to 2.40, particularly preferably of 1.60 to 2.30 and very particularly preferably of 1.75 and 2.20 and/or if component (B) has a melting point of 170 to 205° C., preferably of 175 to 200° C., the melting point being determined by means of DSC according to ISO 11357-3 (2013) with a heating rate of 20 K/min.

Component (C)

According to a preferred embodiment of the present invention, the additives (C) are selected from the group consisting of inorganic and organic stabilisers, in particular antioxidants, antiozonants, light-protection means, in particular UV stabilisers, UV absorbers or UV blockers, lubricants, colourants, marking means, pigments, carbon black, graphite, graphene, carbon nanotubes, photochromic agents, antistatic agents, mould-release means, condensation catalysts, chain regulators, defoamers, antiblocking means, chain-lengthening additives, optical brighteners, IR absorbers, NIR absorbers, halogen-containing flame retardants, halogen-free flame retardants, natural layer silicates, synthetic layer silicates, metallic pigments, metal flakes, metal-coated particles, particulate fillers, fibrous fillers, nanoscale fillers with a particle diameter ($d_{95}$) of max. 100 nm, determined by means of laser diffraction according to ISO 13320 (2009), and mixtures thereof.

The layer silicates and fillers can be surface-treated. This can take place with a suitable sizing- or adhesive system. For this purpose, for example systems based on fatty acids, waxes, silanes, titanates, polyamides, urethanes, polyhydroxyethers, epoxides, nickel respectively combinations or mixtures thereof can be used.

With respect to fibrous or reinforcing fillers, basically no restrictions exist.

As particulate fillers, all fillers known to the person skilled in the art are possible. There are included herein in particular particulate fillers selected from the group consisting of minerals, talc, mica, dolomite, silicates, quartz, titanium dioxide, wollastonite, kaolin, silicic acids, magnesium carbonate, magnesium hydroxide, chalk, ground glass, glass flakes, ground carbon fibres, ground or precipitated calcium carbonate, lime, feldspar, barium sulphate, zinc sulphide, zinc oxide, permanent-magnetic or magnetisable metals or alloys, glass balls, hollow glass balls, hollow-ball silicate fillers and mixtures hereof.

Another preferred embodiment provides that the fibrous fillers are selected from the group consisting of glass fibres, carbon fibres, metal fibres, aramide fibres, plant fibres, cellulose fibres, in particular nanocellulose fibres, polymer fibres, whiskers, mineral fibres and mixtures hereof and particularly preferred are carbon fibres, metal fibres, aramide fibres, plant fibres, cellulose fibres, in particular nanocellulose fibres, polymer fibres, whiskers, mineral fibres and mixtures hereof.

According to a preferred embodiment of the present invention, component (C) is free of glass fibres.

In a particularly preferred embodiment, component (C) is free of fibrous fillers.

Moulded Articles

The moulded articles according to the invention can be produced from the polyamide moulding compound according to the invention via current processing techniques, such as e.g. injection moulding or extrusion methods.

A preferred embodiment of the present invention provides that the moulded article is selected from the group consisting of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g. USB sticks), protective covers for mobile phones, trim parts in the computer and telecommunication field, pipes, hoses, films and components of e-cigarettes.

Uses

Furthermore, the present invention relates to the use of the above-defined polyamide moulding compound according to the invention for the production of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g. USB sticks), protective covers for mobile phones, trim parts in the computer and telecommunication field, pipes, hoses, films and components of e-cigarettes.

The subject according to the invention is intended to be explained in more detail with reference to the subsequent examples without wishing to restrict said subject to the specific embodiments shown here.

1 MEASURING METHODS

Within the scope of this application, the following measuring methods were used.

Relative Viscosity

The relative viscosity was determined according to ISO 307 (2007) at 20° C. For this purpose, 0.5 g polymer granulate was weighed into 100 ml m-cresol, calculation of the relative viscosity (RV) according to $RV=t/t_0$ was effected in accordance with section 11 of the standard.

Glass Transition Temperature (Tg) and Melting Point

Determination of the glass transition temperature and of the melting point was effected according to ISO 11357-2 and -3 (2013) on granulate. The differential scanning calorimetry (DSC) was implemented at each of the two heatings with a heating rate of 20 K/min. After the first heating, the sample was quenched in dry ice. Glass transition temperature (Tg) and melting point were determined during the second heating. The temperature at peak maximum was indicated as melting point. The average of the glass transition range which was indicated as glass transition temperature (Tg) was determined according to the "Half Height" method.

Modulus of Elasticity in Tension

Determination of the modulus of elasticity in tension was implemented according to ISO 527 (2012) at 23° C. with a tensile speed of 1 mm/min on an ISO tensile bar (type A1, mass 170×20/10×4) produced according to the standard ISO/CD 3167 (2003).

Stress Crack Resistance

Determination of the stress crack resistance was implemented according to DIN 53449-3 (1984) bending strip method on ISO tensile bars, standard ISO/CD 3167, type A1, 170×20/10×4 mm at a temperature of 23° C. The edge fibre elongation is measured during the 60 second immersion of the ISO tensile bar under stress in the solvent, cracks are visible with the naked eye. For converting the measured edge fibre elongation into the indicated stress, the percentage value of the edge fibre elongation obtained, written as a decimal, is multiplied by the modulus of elasticity in tension (dry, MPa) of the measured material.

Light Transmission and Haze

Light transmission and haze were determined at 23° C. according to ASTM D 1003 (2013) on 60×60 mm plates (width×length) with 2 mm thickness and film gate on a "Haze Gard plus" of the company Byk Gardner with CIE light type C. The light transmission value was indicated in % of irradiated light quantity.

Production of the Test Pieces

The test pieces were produced on an injection moulding machine by the company Arburg, model Allrounder 420 C 1000-250 with a 3-zone standard screw with a diameter of 25 mm. Cylinder temperatures rising and falling from the feed to the nozzle in the range of 250 to 320° C. were thereby used.

The ISO test bars and plates 60×60×2 mm were produced at a mould temperature 80° C., a polished mould being used for the plates.

The test pieces, unless anything else is indicated, were used in the dry state; for this purpose after the injection moulding, they were stored for at least 48 h at room temperature in a dry environment, i.e. over silica gel.

2 STARTING MATERIALS

The materials used in the examples and comparative examples are compiled in tables 1 and 2.

TABLE 1

Materials used in the examples and comparative examples

| Components | Description | Manufacturer |
|---|---|---|
| Polyamide MACMI/12 (A1) | Amorphous polyamide MACMI/12 made of bis(3-methyl-4-aminocyclo hexyl) methane (32.5% by mol), isophthalic acid (32.5% by mol) and laurinlactam (35% by mol)<br>RV 1.56 (measured with 0.5 g in 100 ml m-cresol at 20° C.)<br>glass transition temperature 160° C. | EMS-CHEMIE AG, Switzerland |
| Polyamide MACM12 (A2) | Amorphous polyamide MACM12 made of bis(3-methyl-4-aminocyclohexyl)methane and dodecanedioic acid<br>RV 1.71 (measured with 0.5 g in 100 ml m-cresol at 20° C.)<br>glass transition temperature 155° C. | EMS-CHEMIE AG, Switzerland |
| Polyamide MACM12/PACM12 (A3) | Amorphous polyamide MACM12/PACM12 made of bis(3-methyl-4-aminocyclohexyl)methane (35% by mol), bis(4-aminocyclohexyl)methane (15% by mol) and dodecanedioic acid (50% by mol)<br>RV 1.85 (measured with 0.5 g in 100 ml m-cresol at 20° C.)<br>glass transition temperature 145° C. | EMS-CHEMIE AG, Switzerland |
| Polyamide MACM16 (A4) | Amorphous polyamide MACM16 made of bis(3-methyl-4-aminocyclohexyl)methane and 1,16-hexadecanedioic acid<br>RV 1.84 (measured with 0.5 g in 100 ml m-cresol at 20° C.)<br>glass transition temperature 140° C. | EMS-CHEMIE AG, Switzerland |
| Polyamide 616 (B1) | Partially crystalline linear aliphatic polyamide 616 made of 1,6-hexanediamine and 1,16-hexadecanedioic acid<br>RV 1.95 (measured with 0.5 g in 100 ml m-cresol at 20° C.)<br>melting point 196° C. | EMS-CHEMIE AG, Switzerland |
| Polyamide 1016 (B2) | Partially crystalline linear aliphatic polyamide 1016 made of 1,10-decanediamine and 1,16-hexadecanedeioic acid<br>RV 1.77 (measured with 0.5 g in 100 ml m-cresol at 20° C.)<br>melting point 176° C. | EMS-CHEMIE AG, Switzerland |
| Polyamide 12 (B3) | Partially crystalline linear aliphatic polyamide 12 made of laurinlactam<br>RV 1.90 (measured with 0.5 g in 100 ml m-cresol at 20° C.)<br>melting point 178° C. | EMS-CHEMIE AG, Switzerland |

RV: relative viscosity measured on a solution of 0.5 g polyamide in 100 ml m-cresol at 20° C.

TABLE 2

Materials used in the examples and comparative examples

| Components | Description | Trade name | Manufacturer |
|---|---|---|---|
| Antioxidant 1 | N,N'-hexan-1,6-diylbis[3-(3,5-di-tert-butyl-4-hydroxyphenylpropionamide CAS-no.: 23128-74-7 | Irganox 1098 | BASF SE, Germany |
| Antioxidant 2 | Tris(2,4-di-tert-butylphenyl)phosphite CAS-no.: 31570-04-4 | Irgafos 168 | BASF SE, Germany |

3 EXAMPLES AND COMPARATIVE EXAMPLES

3.1 General Production Specification

The production of polyamides (A) or polyamides (B1) and (B2) is effected in a known manner in known, agitatable pressure autoclaves with a receptacle and a reaction vessel.

In the receptacle, deionised water is received and the monomers and any additives are added. Thereafter, the solution is made inert multiple times with nitrogen gas. With agitation, heating takes place to 180 to 230° C. under adjusting pressure in order to obtain a homogeneous solution. This solution is pumped through a sieve into the reaction vessel and heated there to the desired reaction temperature of 270 to 310° C. at a pressure of max. 30 bar. The batch is retained in the pressure phase for 2 to 4 hours at the reaction temperature. In the subsequent pressure-reducing phase, the pressure is reduced to atmospheric pressure within 1 to 2.5 hours, the temperature being able to drop slightly. In the following degassing phase, the batch is retained at atmospheric pressure for 1 to 2.5 hours at a temperature of 270 to 300° C. The polymer melt is discharged in strand form, cooled in the water bath at 15 to 80° C. and granulated. The granulate is dried at 80 to 120° C. under nitrogen or in a vacuum to a water content of less than 0.1% by weight.

Suitable catalysts for accelerating the polycondensation reaction are phosphorus-containing acids, such as for example $H_3PO_2$, $H_3PO_3$, $H_3PO_4$, the salts thereof or organic derivatives. The catalysts are added in the range of 0.01 to 0.5% by weight and preferably 0.03 to 0.1% by weight, relative to the polyamide.

Suitable defoamers for avoiding the formation of foam during degassing are aqueous 10% emulsions which include silicones or silicone derivatives and are used in quantities of 0.01 to 1.0% by weight, preferably 0.01 to 0.10% by weight, relative to the polyamide.

Adjustment of the relative viscosity and hence the molar mass can be effected in a known manner, e.g. via monofunctional amines or carboxylic acids, and/or difunctional diamines or dicarboxylic acids as chain regulators. The chain regulators can be used individually or in combination. The normal usage quantity of the monofunctional chain regulators is at 0.1 to 2% by mol, relative to 100% by mol for the polyamide.

3.2 General Production- and Processing Specification for the Polyamide Moulding Compounds For production of the polyamide moulding compound according to the invention, components (A), (B) and possibly (C) are mixed on normal compounding machines, such as e.g. single- or twin-screw extruders or screw kneaders. The components are thereby metered individually via gravimetric metering scales into the feed or respectively into a side feeder or supplied in the form of a dry blend.

If additives (component (C)) are used, these can be introduced directly or in the form of a master batch. The carrier material of the master batch concerns preferably a polyamide or a polyolefin. Amongst the polyamides, there is suitable in particular for this purpose the polyamide of the respective component (A).

For the dry blend production, the dried granulates of components (A), (B) and possibly (C) are mixed in a closed container. This mixture is homogenised by means of a tumble mixer, eccentric mixer or tumble dryer for 10 to 40 minutes. In order to avoid moisture absorption, this can be effected under dried protective gas.

The compounding is effected at set cylinder temperatures of 250 to 320° C., the temperature of the first cylinder being able to be set below 170° C. Degassing can take place in front of the nozzle. This can be effected by means of vacuum or atmospherically. The melt is discharged in strand form, cooled in the water bath at 10 to 80° C. and subsequently granulated. The granulate is dried at 80 to 120° C. under nitrogen or in a vacuum to a water content of below 0.1% by weight.

Processing of the polyamide moulding compounds according to the invention by injection moulding is effected at cylinder temperatures of 250 to 320° C., a temperature profile rising and falling from the feed to the nozzle being able to be used. The mould temperature is set to a temperature of 40 to 140° C., preferably 60 to 120° C.

3.3 Production of the Polyamide Moulding Compound According to Example 1

The dried granulates of components (A) and (B) and additives (C) were mixed to form a dry blend, and in fact in the ratio indicated in table 3. This mixture was homogenised for approx. 20 minutes by means of a tumble mixer.

The polyamide moulding compound was produced on a twin-screw extruder of the company Collin type ZK 25T TL. The dry blend was thereby metered into the feed via metering scales.

The temperature of the first housing was set to 150° C., that of the remaining housings to 270 to 290° C. A speed of rotation of 150 rpm and a throughput of 4 kg/h was used. Degassing did not take place. The melt strand was cooled in the water bath, cut, and the obtained granulate was dried at 90° C. for 24 h in a vacuum (30 mbar) to a water content of below 0.1% by weight.

3.4 Examples and Comparative Examples

In the following tables 3 and 4, the results of the examples and comparative examples according to the present invention are compiled.

TABLE 3

| | | Examples | | | | | | |
|---|---|---|---|---|---|---|---|---|
| | Unit | 1 | 2 | 3 | 4 | 5 | 6 | 7 |
| Components | | | | | | | | |
| PA MACMI/12 (A1) | % by weight | 69.65 | 89.65 | — | — | — | — | — |
| PA MACM12 (A2) | % by weight | — | — | 69.65 | — | — | — | — |
| PA MACM12/ PACM12 (A3) | % by weight | — | — | — | 69.65 | 79.65 | 79.65 | — |
| PA MACM16 (A4) | % by weight | — | — | — | — | — | — | 79.65 |
| PA 616 (B1) | % by weight | 30 | 10 | 30 | 30 | 20 | — | 20 |
| PA 1016 (B2) | % by weight | — | — | — | — | — | 20 | — |
| Antioxidant 1 | % by weight | 0.25 | 0.25 | 0.25 | 0.25 | 0.25 | 0.25 | 0.25 |
| Antioxidant 2 | % by weight | 0.1 | 0.1 | 0.1 | 0.1 | 0.1 | 0.1 | 0.1 |
| Measured values | | | | | | | | |
| Haze | % | 0.7 | 0.5 | 0.6 | 2.0 | 1.5 | 2.3 | 9.7 |
| Light transmission | % | 93.1 | 93.5 | 93.8 | 93.5 | 93.7 | 92.5 | 86.1 |
| Modulus of elasticity in tension | MPa | 1,880 | 1,990 | 1,480 | 1,475 | 1,450 | 1,470 | 1,340 |
| Stress crack resistance | | | | | | | | |
| toluene | MPa | 29 | 20 | 26 | 59 | 54 | 59 | 54 |
| n-hexane | MPa | 42 | 35 | 33 | 26 | 25 | 26 | 34 |

TABLE 4

Comparative examples.

|  | Unit | Comparative examples | | | |
|---|---|---|---|---|---|
|  |  | 8 | 9 | 10 | 11 |
| Components |  |  |  |  |  |
| Polyamide MACMI/12 (A1) | % by weight | 69.65 | — | — | — |
| Polyamide MACM12 (A2) | % by weight | — | 69.65 | — | — |
| Polyamide MACM12/PACM12 (A3) | % by weight | — | — | 69.65 | 79.65 |
| Polyamide 12 (B3) | % by weight | 30 | 30 | 30 | 20 |
| Antioxidant 1 | % by weight | 0.25 | 0.25 | 0.25 | 0.25 |
| Antioxidant 2 | % by weight | 0.1 | 0.1 | 0.1 | 0.1 |
| Measured values |  |  |  |  |  |
| Haze | % | 0.7 | 0.8 | 0.6 | 0.5 |
| Light transmission | % | 92.8 | 93.5 | 93.3 | 93.5 |
| Modulus of elasticity in tension | MPa | 1,950 | 1,580 | 1,560 | 1,580 |
| Stress crack resistance |  |  |  |  |  |
| toluene | MPa | 20 | 24 | 20 | 16 |
| n-hexane | MPa | 24 | 32 | 31 | 36 |

4. DISCUSSION OF THE RESULTS

The moulding compounds of examples 1 to 7 (table 3) according to the invention show, relative to the moulding compounds of the comparative examples 8 to 11 (table 4), better stress crack resistances with the same or even better optical properties. This emerges particularly clearly from comparison of examples 1 or 2 with comparative example 8, PA MACMI/12 being used as polyamide (A) and PA 616 being used as polyamide (B) in examples 1 and 2, whereas comparative example 8 uses PA 12. The moulding compound of example 2 shows in fact, with a third of the addition quantity of polyamide 616 as component (B), better stress crack resistances than the moulding compound of comparative example 8 with polyamide 12 as component (B). In addition, also the haze and the light transition of the moulding compound of example 2 are improved relative to those of comparative example 8.

The combination of very good stress crack resistances and very good optical properties can be achieved therefore only by the specific blend, according to the claim, of polyamides (A) and (B). Blends of an amorphous polyamide and the frequently used partially crystalline polyamide 12 in contrast produce poorer properties.

The invention claimed is:

1. A polyamide moulding compound comprising components (A) to (C):
   (A) 50 to 98% by weight of at least one amorphous or microcrystalline polyamide, selected from the group consisting of PA MACM10, PA MACM12, PA MACM14, PA MACM16, PA MACM18, PA NDT/INDT, PA TMDC10, PA TMDC12, PA TMDC14, PA TMDC16, PA TMDC18, PA PACM10/11, PA PACM10/12, PA PACM12/612, PA PACM12/PACM14/612/614, PA MACMI/12, PA MACMT/12, PA MACMI/MACM12, PA MACMI/MACMN, PA MACMT/MACM12, PA MACMT/MACMN, PA MACM36, PA TMDC36, PA MACMI/MACM36, PA 6I/MACMI/MACM36, PA MACMI/MACMT/12, PA 6I/6T/MACMI/MACMT, PA 6I/6T/MACMI/MACMT/12, PA 6I/6T/MACMI/MACMT/MACM12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM16/1016, PA MACM18/1018, PA 6I/6T/MACMI/MACMT/MACM12/612, PA 6I/6T/MACMI/MACMT/MACM12/12, PA MACMI/MACMT/MACM12/12, PA MACMI/MACMT/MACM12, PA 6I/6T/MACMI/MACMT/12, PA 6I/6T/6N/MACMI/MACMT/MACMN, PA TMDC12/TMDCT/TMDC36, PA TMDC12/TMDCI, PA TMDC12/TMDCI/TMDC36, and PA TMDC12/TMDCT, and copolymers thereof, the MACM being replaceable up to max. 35% by mol by PACM and/or TMDC, relative to the sum of the molar proportions of all the monomers of 100% by mol and/or the laurinlactam being replaceable totally or partially by caprolactam,
   (B) 2 to 40% by weight of at least one partially crystalline polyamide selected from the group consisting of PA 616, PA 516, and PA 1016; and
   (C) 0.1 to 20% by weight of at least one additive selected from the group consisting of inorganic and organic stabilisers, antiozonants, light-protection agents, UV absorbers or UV blockers, lubricants, colourants, marking agents, pigments, carbon black, graphite, graphene, carbon nanotubes, photochromic agents, antistatic agents, mould-release agents, condensation catalysts, chain regulators, defoamers, antiblocking agents, chain-lengthening additives, optical brighteners, IR absorbers, NIR absorbers, halogen-containing flame retardants, halogen-free flame retardants, natural layer silicates, synthetic layer silicates, metallic pigments, metal flakes, metal-coated particles, carbon fibres, metal fibres, plant fibres, polymer fibres, whiskers, and mineral fibres;
   wherein the polyamide moulding compound is free of glass fibres;
   the quantities of components (A) to (C) adding up in total to 100% by weight;
   wherein a test piece made of the polyamide moulding compound
   has a stress crack resistance in toluene, determined according to DIN 53449-3 (1984) bending strip method, of at least 20 MPa; and/or has a stress crack resistance in n-hexane, determined according to DIN 53449-3 (1984) bending strip method, of at least 20 MPa.

2. The polyamide moulding compound according to claim 1, wherein:
the proportion of component (A) in the polyamide moulding compound is in the range of 55 to 95.9% by weight, relative to the total weight of the polyamide moulding compound, and/or
the proportion of component (B) in the polyamide moulding compound is in the range of 4 to 35% by weight, relative to the total weight of the polyamide moulding compound.

3. The polyamide moulding compound according to claim 2, wherein the proportion of component (A) in the polyamide moulding compound is in the range of 63 to 94.7% by weight relative to the total weight of the polyamide moulding compound, and/or
the proportion of component (B) in the polyamide moulding compound is in the range of 5 to 31% by weight, relative to the total weight of the polyamide moulding compound, and/or
the proportion of component (C) in the polyamide moulding compound is in the range of 0.3 to 6% by weight, relative to the total weight of the polyamide moulding compound.

4. The polyamide moulding compound according to claim 1, wherein
the content of naphthalenedicarboxylic acid in component (A) is 0 to 10% by mol, relative to the sum of the molar proportions of all the monomers of components (A) of 100% by mol; and/or
the lactam- and/or ω-amino acid content in component (A) is 0 to 50% by mol, relative to the sum of the molar proportions of all the monomers of component (A) of 100% by mol.

5. The polyamide moulding compound according to claim 1, wherein
component (A) is selected from the group consisting of PA MACM10, PA MACM12, PA MACM14, PA MACM16, PA MACM18, PA MACM36, PA TMDC10, PA TMDC12, PA TMDC14, PA TMDC16, PA TMDC18, PA NDT/INDT, PA PACM10/11, PA PACM10/12, PA PACM12/612, PA PACM12/PACM14/612/614, PA MACMI/12, PA MACMT/12, PA MACMI/MACM12, PA MACMT/MACM12, PA MACMI/MACMT/12, PA MACMI/MACMT/MACM12, PA MACMI/MACMT/MACM12/12, PA MACMI/MACMT/MACM12, PA 6I/6T/MACMI/MACMT, PA 6I/6T/MACMI/MACMT/12, PA 6I/6T/MACMI/MACMT/MACM12/12, PA 6I/6T/MACMI/MACMT/MACM12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM16/1016, and PA MACM18/1018, and
PA MACM10/PACM10, PA MACM12/PACM12, PA MACM14/PACM14, PA MACM16/PACM16, PA MACM18/PACM18, PA 6I/6T/MACMI/MACMT/PACMI/PACMT/12, and PA 6I/6T/MACMI/MACMT/MACM12/PACMI/PACMT/PACM12, wherein the amount of PACM in each of said PA MACM10/PACM10, PA MACM12/PACM12, PA MACM14/PACM14, PA MACM16/PACM16, PA MACM18/PACM18, PA 6I/6T/MACMI/MACMT/PACMI/PACMT/12, and PA 6I/6T/MACMI/MACMT/MACM12/PACMI/PACMT/PACM12 is up to 35% by mole of a respective sum of the amounts of MACM and PACM,
and mixtures or copolymers thereof.

6. The polyamide moulding compound according to claim 5, wherein
component (A) is selected from the group consisting of PA MACM12, PA MACM14, PA MACM16, PA MACM18, PA TMDC16, PA TMDC18, PA NDT/INDT, PA PACM12/612, PA PACM12/PACM14/612/614, PA MACMI/12, PA MACMT/12, PA MACMI/MACM12, PA MACMI/MACMT/12, PA MACMI/MACMT/MACM12, PA 6I/6T/MACMI/MACMT/12, PA MACM10/1010, PA MACM12/1012, PA MACM12/1212, PA MACM14/1014, PA MACM16/1016, PA MACM18/1018, PA MACM10/PACM10, PA MACM12/PACM12, PA MACM14/PACM14, PA MACM16/PACM16, PA MACM18/PACM18, PA 6I/6T/MACMI/MACMT/PACMI/PACMT/12 and mixtures thereof.

7. The polyamide moulding compound according to claim 6, wherein
component (A) is selected from the group consisting of PA MACM14, PA MACM16, PA MACM18, PA MACMI/12, PA MACMI/MACMT/12, PA MACM10/1010, PA MACM14/1014, PA MACM16/1016, PA MACM18/1018, PA MACM12/PACM12, PA MACM14/PACM14, PA MACM16/PACM16, PA MACM18/PACM18 and mixtures thereof.

8. The polyamide moulding compound according to claim 1, wherein
the partially crystalline polyamide (B) is selected from the group consisting of PA 616, PA 1016, and mixtures thereof.

9. The polyamide moulding compound according to claim 8, wherein the partially crystalline polyamide (B) is PA 616.

10. The polyamide moulding compound according to claim 1, wherein
the polyamide moulding compound contains precisely one amorphous or microcrystalline polyamide (A) and precisely one partially crystalline polyamide (B).

11. The polyamide moulding compound according to claim 1, wherein
the haze of the polyamide moulding compound, measured on a moulded article produced from the polyamide moulding compound (2 mm thick plates with width and length: 60×60 mm) according to ASTM D1003 (2013), is <15%; and/or
the transparency, measured on a moulded article produced from the polyamide moulding compound (2 mm thick plates with width and length: 60×60 mm) according to ASTM D1003, is at least 80%.

12. The polyamide moulding compound according to claim 1, wherein a test piece made of the polyamide moulding compound
has a modulus of elasticity in tension, determined according to ISO 527 (2012), of at least 1,000 MPa.

13. A moulded article comprising a polyamide moulding compound according to claim 1.

14. The moulded article according to claim 13, which is selected from the group consisting of decorative elements, sports articles, leisure articles, toys, household articles, components of spectacles, furniture coverings, insoles, construction and trim parts for appliances in the sanitary, hygiene and cosmetic field, parts for safety shoes, filter cups, inspection glasses, through-flow meters, bursting discs, containers, housings or housing parts for electrical and electronic appliances, depilators, measuring devices, infrared keys, mobile phones, players, personal digital assistants (PDA), smart phones or storage media, protective covers for mobile phones, trim parts in the computer and telecommunication field, pipes, hoses, films, and components of e-cigarettes.

15. The polyamide moulding compound of claim 1, wherein the at least one additive of component (C) is selected from the group consisting of inorganic stabilisers, organic stabilisers, antiozonants, light-protection agents, UV absorbers or UV blockers, lubricants, colourants, marking agents, pigments, carbon black, graphite, graphene, carbon nanotubes, photochromic agents, antistatic agents, mould-release agents, condensation catalysts, chain regulators, defoamers, antiblocking agents, chain-lengthening additives, optical brighteners, IR absorbers, NIR absorbers, halogen-containing flame retardants, halogen-free flame retardants, metallic pigments, metal flakes, metal-coated particles, carbon fibres, metal fibres, plant fibres, polymer fibres, whiskers, and mineral fibres.

* * * * *